(12) United States Patent
Terashima et al.

(10) Patent No.: US 12,243,702 B2
(45) Date of Patent: Mar. 4, 2025

(54) PROTECTION SYSTEM, PHOTOVOLTAIC SYSTEM, AND PROTECTION METHOD

(71) Applicant: TMEIC Corporation, Chuo-ku (JP)

(72) Inventors: Daiki Terashima, Tokyo (JP); Yoshihiro Tawada, Tokyo (JP); Tomoya Katsukura, Tokyo (JP)

(73) Assignee: TMEIC CORPORATION, Chuo-ku (JP)

( * ) Notice: Subject to any disclaimer, the term of this patent is extended or adjusted under 35 U.S.C. 154(b) by 247 days.

(21) Appl. No.: 17/755,739

(22) PCT Filed: Oct. 28, 2020

(86) PCT No.: PCT/JP2020/040429
§ 371 (c)(1),
(2) Date: May 6, 2022

(87) PCT Pub. No.: WO2022/091250
PCT Pub. Date: May 5, 2022

(65) Prior Publication Data
US 2022/0392726 A1 Dec. 8, 2022

(51) Int. Cl.
*H01H 71/66* (2006.01)
*H01H 71/04* (2006.01)
(Continued)

(52) U.S. Cl.
CPC ............ *H01H 71/66* (2013.01); *H01H 71/04* (2013.01); *H02H 3/093* (2013.01); *H02H 7/122* (2013.01); *H02H 3/087* (2013.01)

(58) Field of Classification Search
CPC ........ H02H 3/087; H02H 3/093; H02H 7/122; H01H 71/66; H01H 71/04
See application file for complete search history.

(56) References Cited

U.S. PATENT DOCUMENTS

| 11,070,045 B1 * | 7/2021 | Li ........................... H02H 3/207 |
| 2015/0357968 A1 * | 12/2015 | Zhao ....................... H02S 40/36 |
| | | 136/252 |

(Continued)

FOREIGN PATENT DOCUMENTS

| JP | 11-234802 A | 8/1999 |
| JP | 11-332257 A | 11/1999 |

(Continued)

OTHER PUBLICATIONS

Turan Gonen; "Electric Power Distribution Engineering" 3rd edition; 2014; CRC press; p. 576. (Year: 2014).*

(Continued)

*Primary Examiner* — Harry R Behm
(74) *Attorney, Agent, or Firm* — Oblon, McClelland, Maier & Neustadt, L.L.P.

(57) ABSTRACT

A protection system including: a DC power supply; a power converter that converts DC power of the DC power supply into AC power, a circuit breaker that is series-connected to an electrical path located between the DC power supply and the power converter and can open the electrical path; a DC capacitor connected to a circuit located in the power converter; a timer that counts a lapse of a predetermined length of time from turn-on of the circuit breaker; a current detector that detects current flowing in the power converter; and a protection determiner that issues an open operation command to the circuit breaker when the current detector does not detect a decrease in the current after the timer has counted a lapse of the predetermined length of time from turn-on of the circuit breaker.

5 Claims, 6 Drawing Sheets

(51) Int. Cl.
*H02H 3/093* (2006.01)
*H02H 7/122* (2006.01)
*H02H 3/087* (2006.01)

(56) References Cited

U.S. PATENT DOCUMENTS

2018/0366938 A1* 12/2018 Bolanos .................. H02H 3/06
2021/0351744 A1* 11/2021 Marangoni ............. H02S 50/10

FOREIGN PATENT DOCUMENTS

| JP | 2005-192324 A | | 7/2005 |
| JP | 2007-089241 A | | 4/2007 |
| JP | 2014-007909 A | | 1/2014 |
| JP | 2015006074 A | * | 1/2015 |
| JP | 2016103902 A | * | 6/2016 |
| WO | WO 2012/023209 A1 | | 2/2012 |
| WO | WO 2016/017244 A1 | | 2/2016 |
| WO | WO 2019/197459 A2 | | 10/2019 |

OTHER PUBLICATIONS

Office Action issued May 16, 2023, in corresponding Japanese Patent Application No. 2021-569192. (with English Translation), citing document 15 therein, 6 pages.
International Search Report and Written Opinion mailed on Dec. 1, 2020 in PCT/JP2020/040429 filed on Oct. 28, 2020 (citing references AP-AS therein, 2 pages).
Notice of Reasons for Refusal issued Dec. 6, 2022 in Japanese Patent Application No. 2021-569192 (with English machine translation), 6 pages.
English translation of International Preliminary Report on Patentability and Written Opinion issued May 11, 2023 in PCT/JP2020/040429, 6 pages.
Indian Office Action issued Nov. 29, 2023 in Indian Patent Application No. 202217025051, citing references 15-16 therein, 6 pages.
Indian Office Action issued Jul. 24, 2024 in Indian Patent Application No. 202217025051, 2 pages.

* cited by examiner

PROTECTION SYSTEM, PHOTOVOLTAIC SYSTEM, AND PROTECTION METHOD

FIELD

The present application relates to a protection system, a photovoltaic system, and a protection method.

BACKGROUND

In a conventional insulated gate bipolar transistor (IGBT) unit in a power converter (power conditioner) of a photovoltaic system, technology of protection against overcurrent from the DC side is used (see Patent Literature 1, for example). The protection technology generally uses, for example, only a photovoltaic (PV) fuse. Such a photovoltaic system includes, for example, a fuse (PV fuse) that blows in a complete ground-fault state where the detected current value between the solar cell and the power converter exceeds a predetermined set value, and a circuit breaker (DC switch) that is opened when the detected current value exceeds a predetermined set value.

In a device configuration in which the DC of an IGBT unit in a power converter is protected only by a PV fuse, in the event of a device short-circuit fault in the power converter, the protection detection circuit is used for detection of overvoltage or overcurrent of the power converter for protection. When the overvoltage or overcurrent of the power converter is detected for protection, the protection detection circuit protects the IGBT unit in the power converter by halting the power converter and opening the DC switch.

CITATION LIST

Patent Literature

[PTL 1] International Publication No. 2012/023209

SUMMARY

Technical Problem

However, if the PV fuse that protects the IGBT unit from DC current is not completely blown, upon restart of the power converter and re-turn-on of the DC switch, short-circuit current accidentally continues to flow to the device short-circuited IGBT unit from the solar panel. In this case, secondary damage such as device burnout of the power converter may increase.

Therefore, an object of the present invention is to provide a technique for, upon restart of a power converter in which a device short-circuit fault is occurring, detecting an abnormality more quickly so that the extent of secondary damage such as damage to or burnout of the power converter can be reduced.

Solution to Problem

A protection system of one aspect of the present invention is a protection system including: a DC power supply; a power converter that converts DC power of the DC power supply into AC power, a circuit breaker that is series-connected to an electrical path located between the DC power supply and the power converter and can open the electrical path; a DC capacitor connected to a circuit located in the power converter; a timer that counts a lapse of a predetermined length of time from turn-on of the circuit breaker; a current detector that detects current flowing in the power converter; and a protection determiner that issues an open operation command to the circuit breaker when the current detector does not detect a decrease in the current after the timer has counted a lapse of the predetermined length of time from turn-on of the circuit breaker.

The protection system of the aspect may further include a voltage detector that detects a voltage of the DC capacitor, wherein when the current detector detects the current but the voltage detector does not detect the voltage after the timer has counted a lapse of the predetermined length of time from turn-on of the circuit breaker, the protection determiner may issue an open operation command to the circuit breaker.

In the protection system of the aspect, after the timer has counted a lapse of the predetermined length of time from turn-on of the circuit breaker, in at least one of the following situations: where the current detector does not detect a decrease in the current; and where the current detector detects the current but the voltage detector does not detect the voltage, the protection determiner may issue an open operation command to the circuit breaker.

A photovoltaic system of one aspect of the present invention includes the protection system, and the DC power supply is a solar cell panel.

A protection method of one aspect of the present invention is used for a power generation system including: a DC power supply; a power converter that converts DC power of the DC power supply into AC power; a circuit breaker that is series-connected to an electrical path located between the DC power supply and the power converter and can open the electrical path; and a DC capacitor connected to a circuit located in the power converter, the method including: a counting step of counting a lapse of a predetermined length of time from turn-on of the circuit breaker; a current detection step of detecting current flowing in the power converter; and a protection determination step of issuing an open operation command to the circuit breaker when a decrease in the current is not detected in the current detection step after a lapse of the predetermined length of time from turn-on of the circuit breaker has been counted in the counting step.

The protection method of the aspect may further include a voltage detection step of detecting a voltage of the DC capacitor, wherein when the current is detected in the current detection step but the voltage is not detected in the voltage detection step after a lapse of the predetermined length of time from turn-on of the circuit breaker has been counted in the counting step, an open operation command may be issued to the circuit breaker in the protection determination step.

In the protection method of the aspect, after a lapse of the predetermined length of time from turn-on of the circuit breaker has been counted in the counting step, in at least one of the following situations: where a decrease in the current is not detected in the current detection step; and where the current is detected in the current detection step but the voltage is not detected in the voltage detection step, an open operation command may be issued to the circuit breaker in the protection determination step.

In the protection method of the aspect, the DC power supply may be a solar cell panel, and the power generation system may be a photovoltaic system.

Advantageous Effects of Invention

According to the present invention, upon restart of a power converter in which a device short-circuit fault is occurring, an abnormality can be detected more quickly so that the extent of secondary damage such as breakage and burnout of the power converter can be reduced.

BRIEF DESCRIPTION OF DRAWING

FIG. 6 is a graph showing an example of a change in the DC current and a change in the voltage of a DC capacitor after the DC switch is turned on.

DESCRIPTION OF EMBODIMENT

An embodiment of a protection system and a protection method according to the present invention will now be described with reference to the drawings.
<Configuration of Embodiment>

Figure 1:
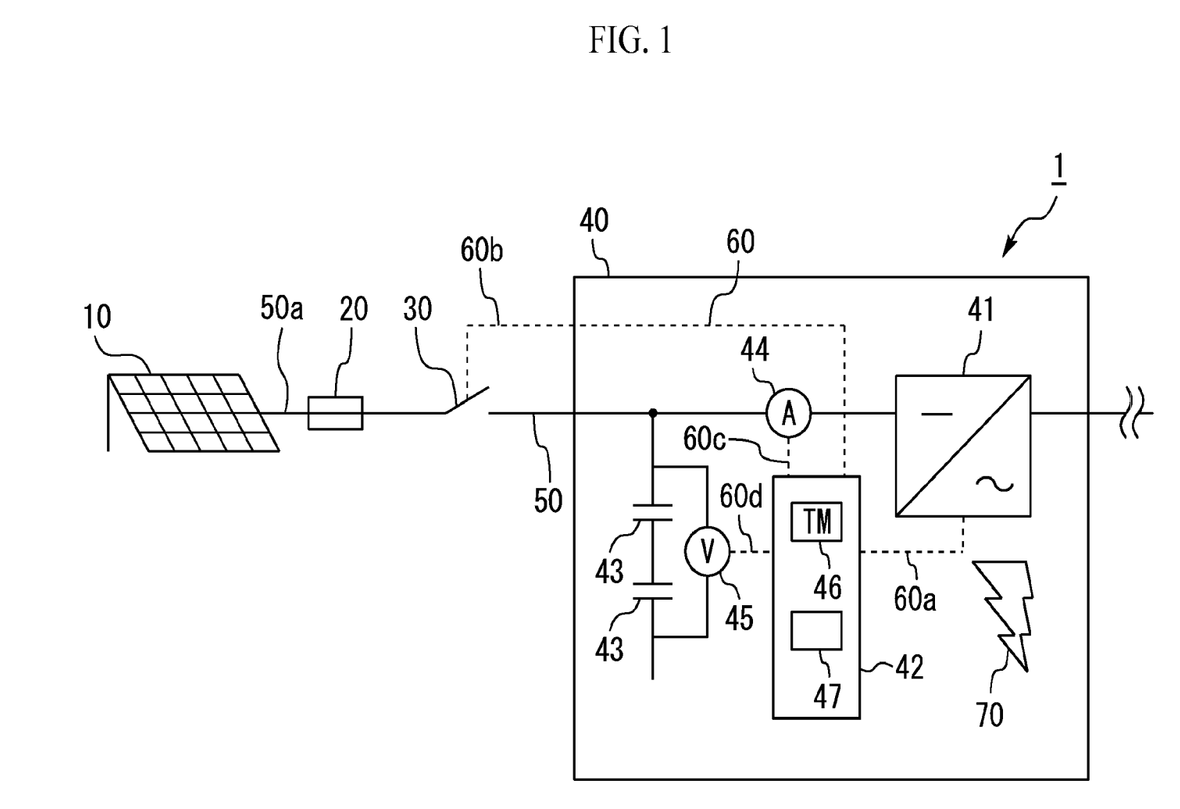
FIG. 1 is a configuration diagram showing one embodiment of a protection system and a protection method according to the present invention.

FIG. 1 is a configuration diagram showing one embodiment of the protection system and the protection method according to the present invention. The protection system and protection method of the present invention are applicable to, for example, a photovoltaic system. Therefore, one embodiment will be described using the photovoltaic system 1.

As shown in FIG. 1, the photovoltaic system 1 includes a solar cell panel 10, a PV fuse 20, a DC switch 30, a power converter 40, and an electrical path (DC bus) 50. The solar cell panel 10, the PV fuse 20, the DC switch 30, and the power converter 40 are connected in series via an electrical path 50. The photovoltaic system 1 is a system connected to a power system (not shown) on the right side in the drawing. Reference numeral 60 represents a signal line, and reference numeral 70 shows that a device short-circuit is occurring.

The solar cell panel 10, which is also referred to as a solar panel, a solar cell module, a solar module, or simply a module, is made up of a plurality of solar cells combined into one panel. FIG. 1 shows one solar cell panel 10 for convenience, which, in reality, may form a solar cell string composed of a plurality of solar cell panels 10 combined in series or in parallel, or a solar cell array of solar cell strings combined. The solar cell panel 10 is an example of a DC power supply according to Claims, and supplies DC power to the power converter 40.

When a current exceeding a predetermined current value flows through the electrical path 50 due to some abnormality in the photovoltaic system 1, the PV fuse 20 protects the circuit in such a way that the alloy component contained therein is blown by Joule heat to open the circuit. However, the PV fuse 20 conforms to a standard in which it is not blown even if the DC power supplied from the solar cell panel 10 shown in FIG. 1 is the maximum. Hence, even if a device short-circuit occurs in the power converter 40, the PV fuse 20 is not completely blown.

The DC switch 30 is series-connected to the electrical path 50 located between the PV fuse 20 and the power converter 40, and connects or opens the electrical path 50 in response to a turn-on command or open command from the inverter control circuit 42 described later or an operator. When the DC switch 30 is opened, the DC current supplied from the solar cell panel 10 flowing into the power converter 40 is blocked. Note that the DC switch 30 is an example of the circuit breaker according to Claims.

The power converter 40 is connected to the solar cell panel 10 via the electrical path 50, and converts the DC power generated by the solar cell panel 10 into AC power. The power converter 40 includes an inverter circuit 41, an inverter control circuit 42, a DC capacitor 43, an ammeter 44, and a voltmeter 45.

The power converter 40 is configured to perform known maximum power point tracking (MPPT). Maximum power point tracking control (MPPT control) is a control function for extracting current at an output voltage that maximizes the power from the solar cell panel 10. It is preferable that the power converter 40 also have an output limiter function. The power converter 40 is also referred to as an inverter unit, a power conditioner, and a power conditioning subsystem (PCS).

The inverter circuit 41 includes a plurality of switching devices such as IGBTs. The inverter control circuit 42 generates a pulse width modulation signal serving as a gate drive signal for the switching devices. The inverter control circuit 42 is connected to the inverter circuit 41 via a signal line 60a, and controls the operation of the inverter circuit 41.

The inverter control circuit 42 has the functions of the timer 46 and the protection determiner 47, which will be described later. The inverter control circuit 42 is connected to the DC switch 30, the inverter circuit 41, the ammeter 44, and the voltmeter 45, via the signal line 60. In the event of an accident such as a device short-circuit 70 in the inverter circuit 41, the inverter control circuit 42 performs detection of and protection from overcurrent and overvoltage based on the value obtained through the ammeter 44 and the values obtained through other sensors. After detection of overcurrent and overvoltage for protection and, the inverter control circuit 42 halts the power converter 40 and an open operation command is given to the DC switch 30 via the signal line 60b. Thus, the inverter control circuit 42 reduces the flow of short-circuit current into the inverter circuit 41, thereby protecting the inverter circuit 41.

The DC capacitor 43 is charged with DC power supplied from the solar cell panel 10 when the DC switch 30 is turned on during halt or gate block (GB) of the power converter 40. Hence, in normal operation, upon the lapse of a predetermined length of time since the DC switch 30 is turned on, the value of the voltage of the DC capacitor 43 increases and the DC current value decreases. When the voltage of the DC capacitor 43 has increased and charging has been completed, discharge of the DC capacitor 43 triggers the operation of the power converter 40 and also cancels the gate block (GB).

However, in the event of an accident such as a device short-circuit 70 in the power converter 40, even if the DC switch 30 is turned on, only the short-circuit current continues to flow and the DC capacitor 43 is not charged. Accordingly, in the event of the device short-circuit 70 in the power converter 40, even after the lapse of a predetermined length of time since the DC switch 30 was turned on, the voltage of the DC capacitor 43 does not increase and the DC current value does not decrease. The present invention takes advantage of this nature of the DC capacitor 43, the details of which will be described later.

The ammeter 44 is, for example, a current sensor such as a Hall CT, and measures the current flowing in the power converter 40 or the inverter circuit 41. The ammeter 44 is connected to the inverter control circuit 42 via a signal line 60c. Note that the ammeter 44 is not necessarily provided in the position shown in FIG. 1, and may be provided in, for example, the inverter circuit 41 or the inverter control circuit 42, instead. Note that the ammeter 44 is an example of the current detector according to Claims.

The voltmeter 45 is, for example, a DC voltage sensor, and measures the voltage of the DC capacitor 43. The voltmeter 45 is connected to the inverter control circuit 42 via a signal line 60d. The voltmeter 45 may be provided in any position where it can measure the voltage of the DC capacitor 43, and is not necessarily be in the position shown in FIG. 1. Note that the voltmeter 45 is an example of the voltage detector according to Claims.

The timer 46 is one of the functions of the inverter control circuit 42 and, at turn-on of the DC switch 30 during halt or gate block (GB) of the power converter 40, detects turn-on of the DC switch 30 and counts a lapse of a predetermined length of time from the turn-on of the DC switch 30. Note that the timer 46 may be provided separately from the inverter control circuit 42.

The protection determiner 47 is one of the functions of the inverter control circuit 42 and detects whether or not an abnormality such as occurrence of the device short-circuit 70 by one or both of the following two methods. Upon detection of an abnormality such as the occurrence of a device short-circuit 70, the protection determiner 47 opens the DC switch 30 via the signal line 60b to protect the inverter circuit 41. Note that the protection determiner 47 may be provided separately from the inverter control circuit 42.

In a first method, when the timer 46 counts a lapse of a predetermined length of time from turn-on of the DC switch 30, the protection determiner 47 determines whether the ammeter 44 has detected a decrease in current. When it is determined that the ammeter 44 has detected a decrease in current, it is determined that the device short-circuit 70 has not occurred, and the power converter 40 is made to continue its normal operation.

In contrast, upon determination that the ammeter 44 has not detected a decrease in current, the protection determiner 47 determines that an abnormality such as a device short-circuit 70 is occurring and issues an open operation command to the DC switch 30 via the signal line 60b. When the device short-circuit 70 occurs, only the short-circuit current continues to flow and the DC capacitor 43 is not charged, so that the current value does not decrease. Hence, the protection determiner 47 detects an abnormality such as a device short-circuit 70 by taking advantage of the nature of the DC capacitor 43 and opens the DC switch 30, thereby protecting the power converter 40.

In a second method, when the timer 46 counts a lapse of a predetermined length of time from turn-on of the DC switch 30, the protection determiner 47 determines whether the ammeter 44 has detected a current and the voltmeter 45 has detected a voltage. When it is determined that the ammeter 44 has detected a current and the voltmeter 45 has detected a voltage, it is determined that the device short-circuit 70 has not occurred, and the power converter 40 is made to continue its normal operation.

In contrast, upon determination that the ammeter 44 has detected a current and the voltmeter 45 has not detected a voltage, the protection determiner 47 determines that an abnormality such as a device short-circuit 70 is occurring and issues an open operation command to the DC switch 30 via the signal line 60a. When the device short-circuit 70 occurs, only the short-circuit current continues to flow and the DC capacitor 43 is not charged, so that an increase in the voltage of the DC capacitor 43 is not observed. Hence, the protection determiner 47 detects an abnormality such as a device short-circuit 70 by taking advantage of the nature of the DC capacitor 43 and opens the DC switch 30, thereby protecting the power converter 40.

Note that the protection determiner 47 may detect an abnormality such as a device short-circuit 70 by using the first method or the second method or both. In other words, upon a lapse of a predetermined length of time, if it is determined that the ammeter 44 has detected a current but not detected a decrease in current and the voltmeter 45 has not detected a voltage, the protection determiner 47 may determine that an abnormality such as a device short-circuit 70 is occurring.

Next, the operation of one embodiment of the present invention will be described.

<Operation of Embodiment>

Figure 2:
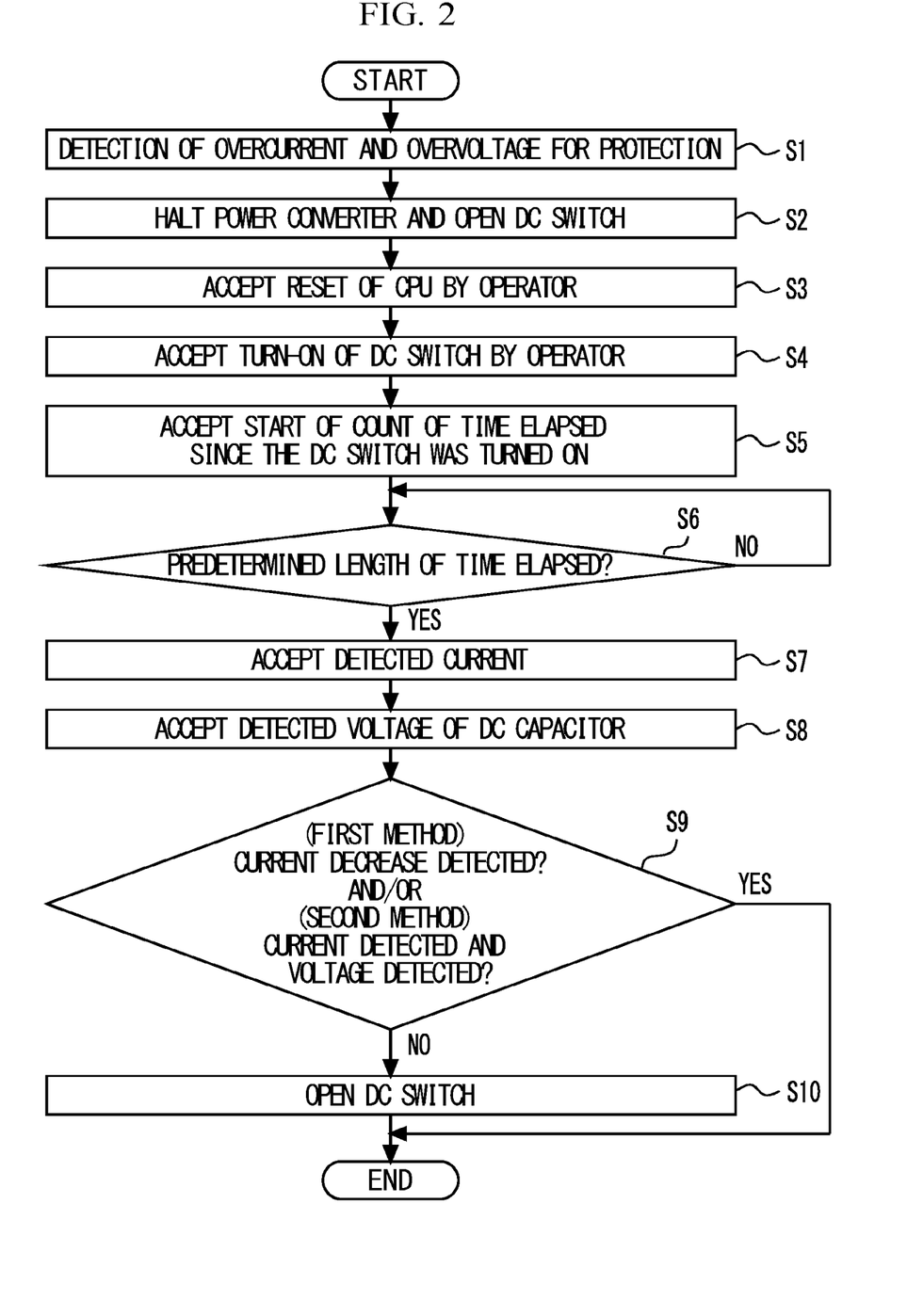
FIG. 2 is a flowchart showing an example of the operation of the protection system and the protection method shown in FIG. 1.

FIG. 2 is a flowchart showing an example of the operation of the protection system and the protection method shown in FIG. 1. The flowchart of FIG. 2 is started when an abnormality such as a device short-circuit 70 occurs in the inverter circuit 41 or the like.

In Step S1, the inverter control circuit 42 performs detection of and protection from overcurrent and overvoltage by a sensor or the like in the power converter 40. In the event of an accident such as a device short-circuit 70 in the inverter circuit 41, a sharp increase in current and voltage is observed and the inverter control circuit 42 therefore performs detection of and protection from the sharp increase in current and voltage.

In Step S2, the inverter control circuit 42 halts the operation of the power converter 40 and issues an open operation command to the DC switch 30 via the signal line 60b. Accordingly, the power converter 40 goes into the gate block (GB) state. Thus, the inverter control circuit 42 prevents a short-circuit current from flowing into the inverter circuit 41 and to protect the power converter 40.

In Step S3, the inverter control circuit 42 accepts the reset of the central processing unit (CPU) of the power converter 40 by the operator. In Step S3, the accident of the device short-circuit 70 has been correctly detected from a sharp increase in current and voltage in Step S2 and the power converter 40 is in halt due to a serious failure. In this case, when the CPU of the power converter 40 is reset by the operator, neither current nor voltage exists in the inverter circuit 41, and the operator cannot therefore determine whether or not an accident is occurring. Consequently, the power converter 40 and the inverter circuit 41 look normal to the operator, and the DC switch 30 may be erroneously turned on by the operator.

In Step S4, the inverter control circuit 42 accepts the re-turn on of the DC switch 30 by the operator. This is, for example, when the operator does not notice that an accident is occurring and the DC switch 30 is erroneously turned on by the operator. In this case, even if the DC switch 30 is turned on again, the current and voltage do not increase sharply in the inverter circuit 41 as in the event of an accident of the device short-circuit 70. Consequently, as in Step S1, the inverter control circuit 42 does not perform detection of and protection from the overcurrent and overvoltage.

Figure 3:
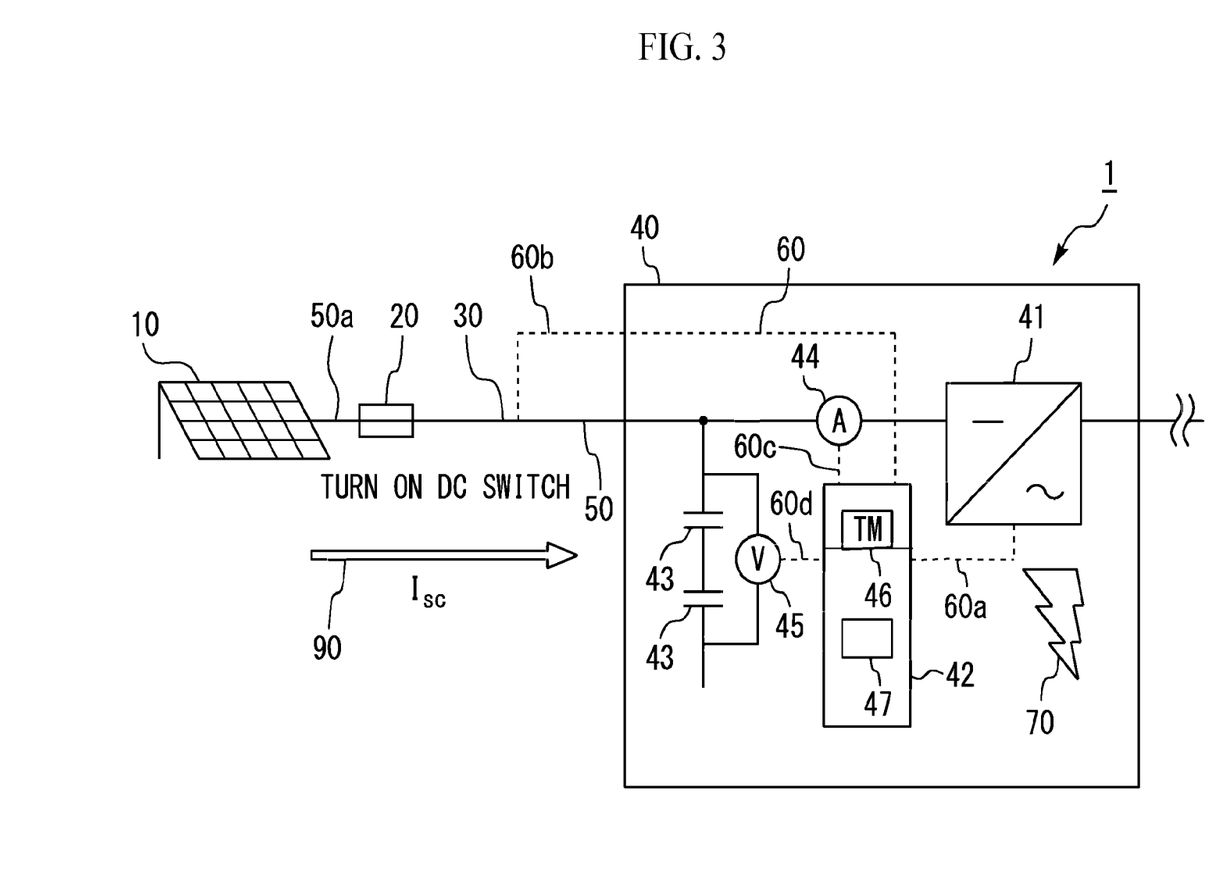
FIG. 3 is a configuration diagram showing an example of the state where a DC switch has been turned on again.

FIG. 3 is a configuration diagram showing an example of the state where the DC switch 30 has been turned on again. In FIG. 3, the same components as those in FIG. 1 are denoted by the same reference numerals as those in FIG. 1, and the detailed description will be omitted. As shown in FIG. 3, during the device short-circuit 70, a short-circuit current Isc 90 flows from the solar cell panel 10 toward the power converter 40.

Here, a PV fuse 20 is provided in the position of the electrical path 50a. However, since accidents supposed to be protected by the PV fuse 20 do not include an accident of a device short-circuit 70 in the inverter circuit 41, the PV fuse 20 is not completely blown even if a device short-circuit 70 occurs in the inverter circuit 41. Strictly speaking, also in this case, the PV fuse 20 may be blown partially but not completely. Therefore, the PV fuse 20 is not completely blown until Step S3, and the PV fuse 20 is not completely blown even in Step S4.

Figure 4:
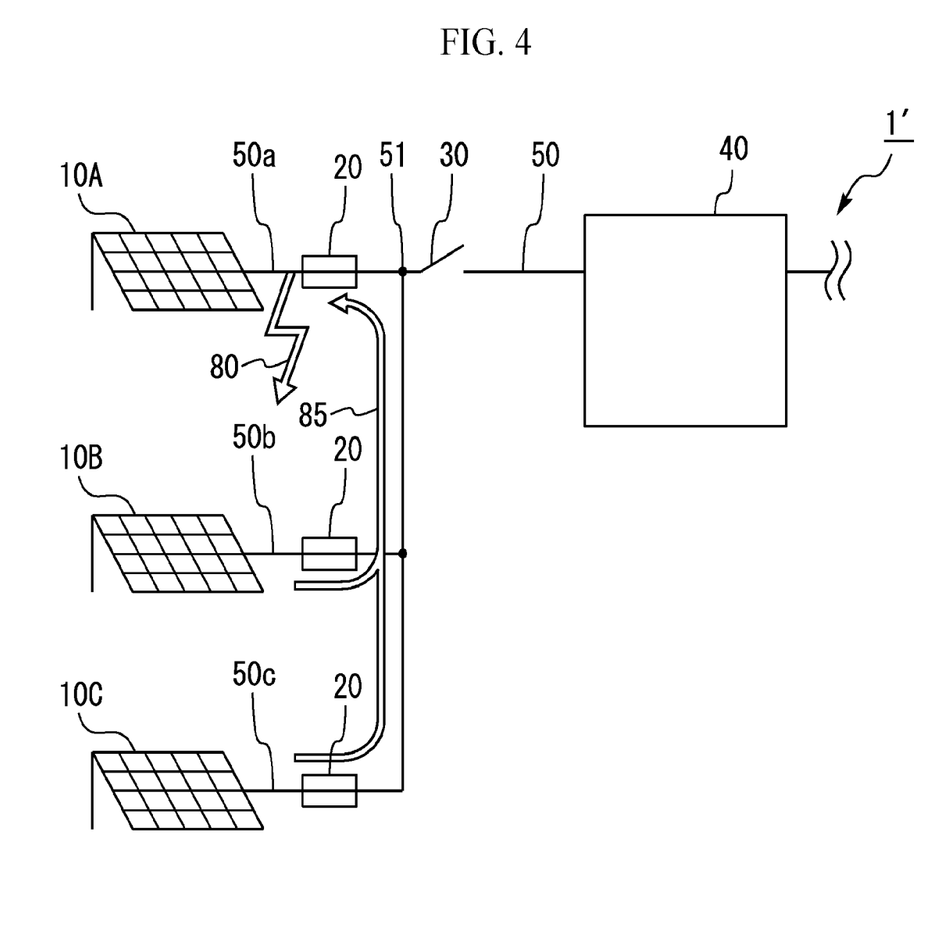
FIG. 4 is a configuration diagram showing an example of the case where a PV fuse is completely blown.

FIG. 4 is a configuration diagram showing an example of the case where a PV fuse 20 is completely blown. The photovoltaic system 1' shown in FIG. 4 differs from the photovoltaic system 1 shown in FIG. 1 in that three solar cell panels 10A, 10B, and 10C are connected in parallel and are connected to the electrical path 50 at the connection point 51. In FIG. 4, the same components as those in FIG. 1 are denoted by the same reference numerals as those in FIG. 1, and the detailed description will be omitted. Although three solar cell panels 10A, 10B, and 10C are shown in FIG. 4, these are not necessarily three and only have to be plural. Moreover, the plurality of solar cell panels 10A, 10B, and 10C may be a plurality of solar cell strings or a plurality of solar cell arrays.

As shown in FIG. 4, for example, when a ground-fault 80 occurs in the system of the solar cell panel 10A, the ground-fault current 85 indicated by the arrow in the drawing flows into the system of the solar cell panel 10A. In this case, a current many times higher than usual may flow into the electrical path 50a in the system of the solar cell panel 10A from the electrical paths 50b and 50c toward the ground-fault point. The PV fuse 20 conforms to a standard that is blown only when current flows from the system of the solar cell panels 10B and 10C, which is a system different from the system of the solar cell panel 10A, toward the ground-fault point. Accordingly, since accidents in which the PV fuse 20 is supposed to be blown do not include an accident of a device short-circuit 70 in the power converter 40, even in the event of an abnormality such as a device short-circuit 70, the PV fuse 20 is not completely blown.

Figure 5:
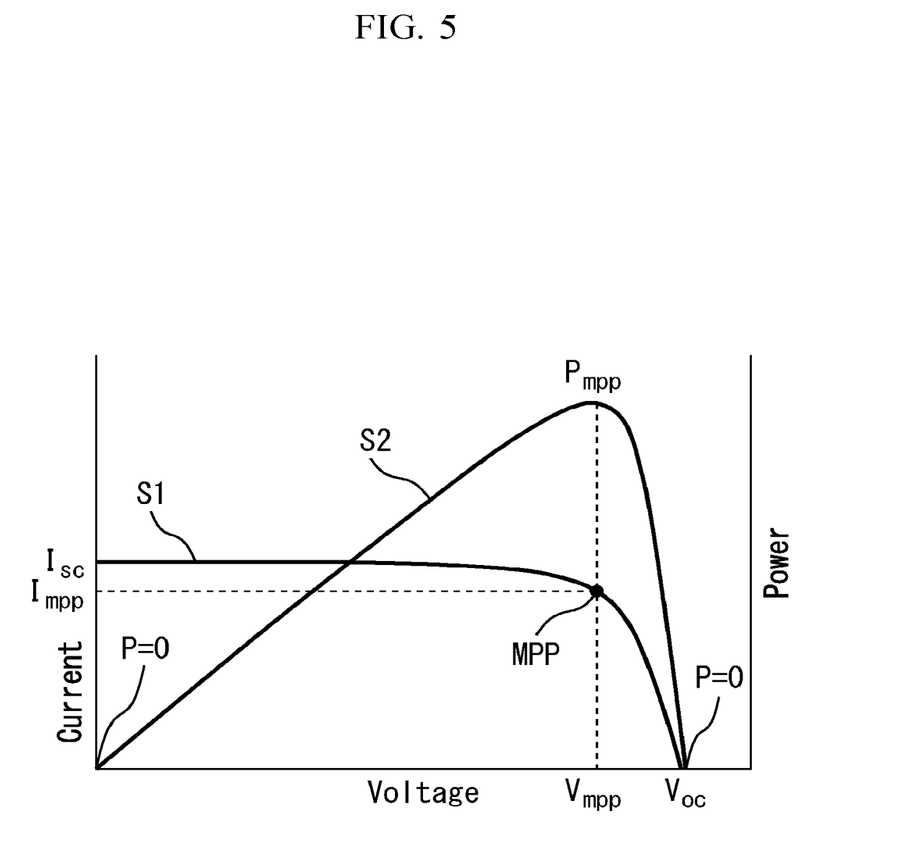
FIG. 5 is a graph showing an example of a solar cell current-voltage characteristic curve (I-V curve).

FIG. 5 is a graph showing an example of a solar cell current-voltage characteristic curve (I-V curve). FIG. 5 shows an optimum operating point Pmpp, a maximum output operating voltage Vmpp, a maximum output operating current Impp, an open circuit voltage Voc, and a short-circuit current Isc. The optimum operating point Pmpp is the maximum point at which the power characteristic curve S2, which is the product of the operating voltage and the operating current in the current-voltage characteristic curve S1, becomes the maximum.

The maximum output operating voltage Vmpp is the operating voltage at the MPP point which is the optimum operating point. The maximum output operating current Impp is the operating current at the MPP point which is the optimum operating point. The open circuit voltage Voc is a voltage obtained in the open state where no load or the like is connected to the output terminals of the solar cells. The short-circuit current Isc is the current that flows when the output terminals of the solar cells are short-circuited. The current-voltage characteristic curve S1 is a generally rectangular curve having a bent portion near the MPP point which is the optimum operating point. The power characteristic curve S2 rises straight from zero voltage toward the optimum operating point Pmpp, and falls sharply from the optimum operating point Pmpp.

As shown in FIG. 5, the short-circuit current Isc is a current that can be assumed from the current-voltage characteristic (I-V characteristic) of the solar cell panel 10, and is a halfway current slightly higher than the normal maximum output operating current Impp. Thus, as shown in FIG. 3, even if the DC switch 30 is turned on again and the short-circuit current Isc 90 flows, the detection of and protection from overcurrent and overvoltage is not performed by the inverter control circuit 42, and the PV fuse 20 is not completely blown. However, if the short-circuit current Isc 90 continues to flow, secondary damage such as breakage and burnout of the device occurs. Consequently, even in such a case, it is necessary to detect an abnormality such as a device short-circuit 70 as soon as possible.

Returning to FIG. 2, in Step S5, the protection determiner 47 accepts the start of count of time elapsed since the DC switch 30 was turned on which is performed by the timer 46.

In Step S6, the protection determiner 47 determines whether or not the timer 46 has counted a lapse of a predetermined length of time. Upon determination that the predetermined length of time has elapsed, the protection determiner 47 forces the process to proceed to Step S7. In contrast, upon determination that the predetermined length of time has not elapsed, the protection determiner 47 repeats the process up to Step S6 until the predetermined length of time has elapsed.

In Step S7, the protection determiner 47 accepts the value of the current flowing in the power converter 40 measured by the ammeter 44. Note that the ammeter 44 may constantly measure the value of the current flowing in the power converter 40.

In Step S8, the protection determiner 47 accepts the value of the voltage of the DC capacitor 43 connected to the circuit in the power converter 40 measured by the voltmeter 45. Note that the voltmeter 45 may constantly measure the value of the voltage of the DC capacitor 43 connected to the circuit in the power converter 40.

In Step S9, the protection determiner 47 determines whether or not an abnormality such as a device short-circuit 70 is occurring in the inverter circuit 41. The principle of the determination of whether or not an abnormality is occurring by the protection determiner 47 will now be explained.

Figures 6, 6A:
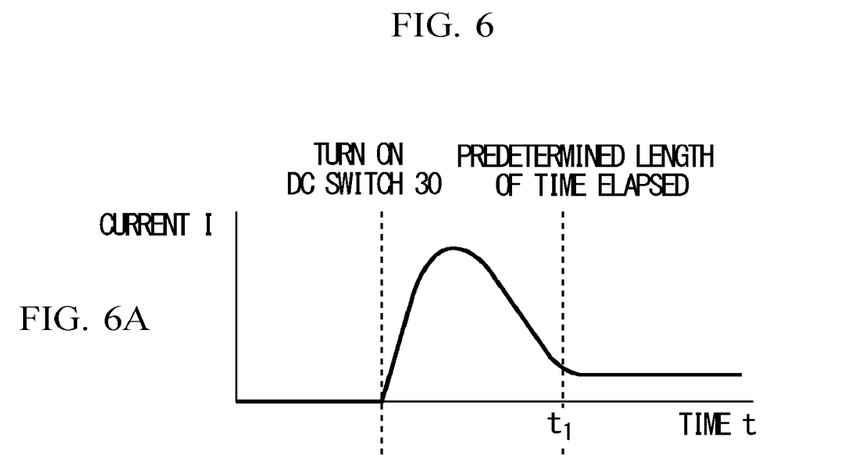

FIG. 6 is a graph showing an example of a change in the DC current and a change in the voltage of the DC capacitor 43 after the DC switch 30 is turned on.

FIG. 6A is a graph showing an example of a change in the DC current after the DC switch 30 is turned on while no device short-circuit 70 is occurring. Referring to FIG. 6A, the current increases after the DC switch 30 is turned on, but decreases after the predetermined time t1 has elapsed. This is because the charging of the DC capacitor 43 is almost completed after the predetermined length of time t1 has elapsed.

Figure 6B:
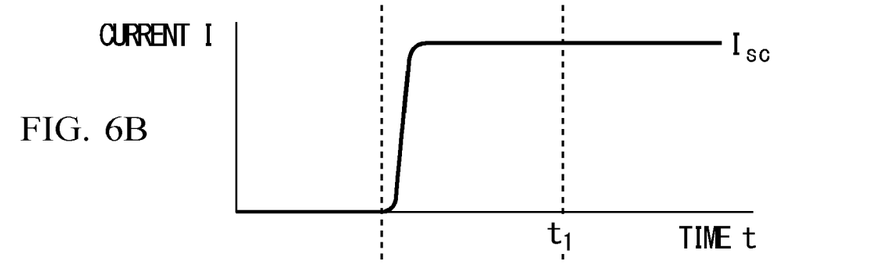

FIG. 6B is a graph showing an example of a change in the DC current after the DC switch 30 is turned on while a device short-circuit 70 is occurring. Referring to FIG. 6B, the current sharply increases to the short-circuit current Isc after the DC switch 30 is turned on, and is maintained at the increased level even after the predetermined time t1 has elapsed. This is because when the device short-circuit 70 is occurring, the DC capacitor 43 is not charged and the short-circuit current Isc continues to flow through the inverter circuit 41.

Figure 6C:
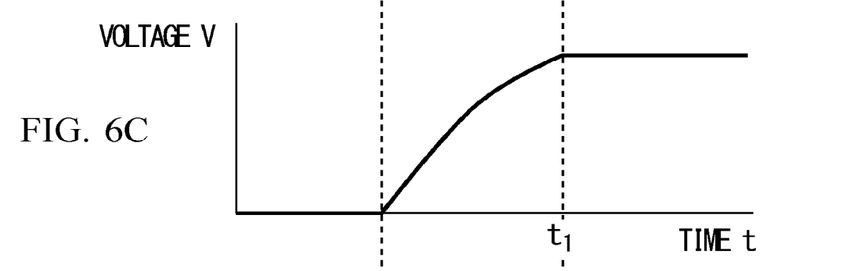

FIG. 6C is a graph showing an example of a change in the voltage of the DC capacitor after the DC switch 30 is turned on while no device short-circuit 70 is occurring. Referring to FIG. 6C, the current keeps increasing until the predetermined length of time t1 has elapsed since the DC switch 30 is turned on and, after the lapse of the predetermined length of time t1, the voltage value is kept constant. This is because the charging of the DC capacitor 43 is almost completed after the predetermined length of time t1 has elapsed.

Figure 6D:
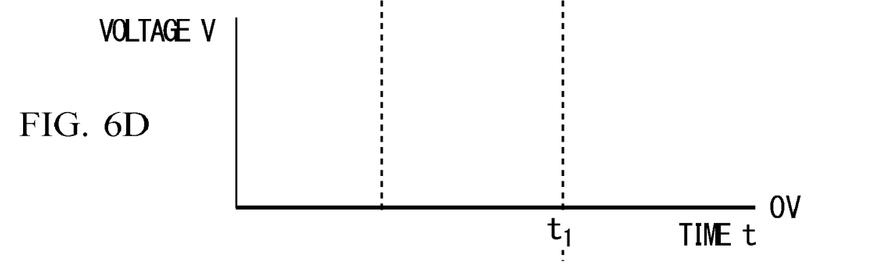

FIG. 6D is a graph showing an example of a change in the voltage of the DC capacitor after the DC switch 30 is turned on while a device short-circuit 70 is occurring. Referring to FIG. 6D, the voltage does not rise from 0 V even when the DC switch 30 is turned on, and remains 0 V even after the lapse of the predetermined length of time t1. This is because while the device short-circuit 70 is occurring, only the short-circuit current Isc continues to flow in the inverter circuit 41, and the DC capacitor 43 is not charged.

As shown in FIG. 6, the DC current measured after the lapse of the predetermined length of time t1 from turn-on of the DC switch 30, and the voltage of the DC capacitor 43 during the period when the device short-circuit 70 is occurring are different from those during the period when no device short-circuit 70 is occurring. This is because of the nature of the DC capacitor 43. For this reason, the protection determiner 47 takes advantage of such a difference between the current values and voltage values to determine whether or not an abnormality such as a device short-circuit 70 is occurring in the inverter circuit 41. The determination is made by one or both of the following two methods.

In other words, in Step S9, as the first method, the protection determiner 47 determines whether or not the ammeter 44 has detected a decrease in current. Upon determination that the ammeter 44 has detected a decrease in current (FIG. 6A), the protection determiner 47 determines that no abnormality is occurring and ends the process of this flowchart. In contrast, upon determination that the ammeter 44 has not detected a decrease in current (FIG. 6B), the protection determiner 47 determines that an abnormality is occurring and makes the process proceed to Step S10.

In Step S9, as the second method, the protection determiner 47 determines whether or not the voltmeter 45 has detected a voltage when the ammeter 44 detects a current. Upon determination that the ammeter 44 has detected a current and the voltmeter 45 has detected a voltage (FIG. 6C), the protection determiner 47 determines that no abnormality is occurring and ends the process of this flowchart. In contrast, upon determination that the ammeter 44 has detected a current and the voltmeter 45 has not detected a voltage (FIG. 6D), the protection determiner 47 determines that an abnormality is occurring and makes the process proceed to Step S10.

In Step S10, the protection determiner 47 issues an open operation command to the DC switch 30 and ends the process of this flowchart. Opening the DC switch 30 prevents the subsequent inflow of the short-circuit current Isc into the inverter circuit 41.

<Effects of Embodiment>

As described above, in the first method in the embodiment shown in FIGS. 1 to 6, when the ammeter 44 does not detect a decrease in current after a predetermined length of time has elapsed since the DC switch 30 is turned on, the protection determiner 47 issues an open operation command to the DC switch 30. Consequently, even if the PV fuse 20 is not completely blown in the event of the device short-circuit 70, the abnormality is detected more quickly upon restart of the power converter 40, which contributes to a decrease in the expansion of secondary damage such as breakage and burnout of the power converter 40.

In the second method, when the ammeter 44 detects a current but the voltmeter 45 does not detect a voltage after a predetermined length of time has elapsed since the DC switch 30 is turned on, the protection determiner 47 issues an open operation command to the DC switch 30. Consequently, even if the PV fuse 20 is not completely blown in the event of the device short-circuit 70, the abnormality is detected more quickly upon restart of the power converter 40, which contributes to a decrease in the expansion of secondary damage such as breakage and burnout of the power converter 40.

<Supplementary Information for Embodiment>

In the embodiment shown in FIGS. 1 to 6, the voltmeter 45 is included in the configuration shown in FIG. 1. However, if the first method is adopted, the voltmeter 45 is not necessarily included in the configuration. This is because the value of the voltage of the DC capacitor 43 is not taken into consideration when the first method is adopted in Step S9. In this case, the processing in Step S8 in FIG. 2 may be omitted. This provides the same effect as that of the embodiment shown in FIGS. 1 to 6.

In the embodiment shown in FIGS. 1 to 6, the ammeter 44 is included in the configuration shown in FIG. 1. However, when the second method is adopted, the ammeter 44 is not necessarily included in the configuration. This is because it is possible that, when the second method is adopted in Step S9, as a modification of the second method, the protection determiner 47 detects the occurrence of an abnormality, such as a device short-circuit 70, depending only on whether or not the voltmeter 45 detects a voltage after a lapse of a predetermined length of time. In this case, the processing in Step S7 in FIG. 2 may be omitted. This provides the same effect as that of the embodiment shown in FIGS. 1 to 6.

The detailed description above will clarify the features and advantages of the embodiment. This is for the purpose of showing that the claims cover the features and advantages of the embodiment described above without departing from their spirit and scope. In addition, those skilled in the art should be able to easily conceive any improvements or changes. Therefore, the scope of the embodiment having novelty is not intended to be limited to the above description, and the claims can also be based on appropriate improvements and equivalents included in the scope disclosed in the embodiment.

REFERENCE SIGNS LIST 1, 1' Photovoltaic system
10, 10A, 10B, 10C Solar cell panel
20 PV fuse
30 DC switch
40 Power converter
41 Inverter circuit
42 Inverter control circuit
43 DC capacitor
44 Ammeter
45 Voltmeter
46 Timer
47 Protection determiner
50, 50a, 50b, 50c Electrical circuit (DC bus)
51 Connection point
60, 60a, 60b, 60c, 60d Signal line
70 Device short-circuit
80 Ground-fault
85 Ground-fault current
90 Short-circuit current (Isc)

The invention claimed is:

1. A protection system comprising:
   a DC power supply;
   a power converter that converts DC power of the DC power supply into AC power;
   a circuit breaker that is series-connected to an electrical path located between the DC power supply and the power converter and can open the electrical path;
   a DC capacitor connected to a circuit located in the power converter;
   a timer that counts a lapse of a predetermined length of time from turn-on of the circuit breaker;
   a current detector that detects current flowing in the power converter;
   a fuse provided between the DC power supply and the circuit breaker; and
   a protection determiner that issues an open operation command to the circuit breaker when the current detector does not detect a decrease in the current after the timer has counted a lapse of the predetermined length of time from turn-on of the circuit breaker and when a short-circuit current flowing at the time of element short-circuiting of an inverter circuit included in the power converter is lower than a current that completely blows out the fuse.

2. A photovoltaic system comprising the protection system according to claim 1, wherein the DC power supply is a solar cell panel.

3. The protection system according to claim 1, wherein the protection determiner is provided inside the power converter.

4. A protection method for a power generation system comprising:
   a DC power supply;
   a power converter that converts DC power of the DC power supply into AC power;
   a circuit breaker that is series-connected to an electrical path located between the DC power supply and the power converter and can open the electrical path;
   a DC capacitor connected to a circuit located in the power converter; and
   a fuse provided between the DC power supply and the circuit breaker, the method comprising:
   a counting step of counting a lapse of a predetermined length of time from turn-on of the circuit breaker;
   a current detection step of detecting current flowing in the power converter; and
   a protection determination step of issuing an open operation command to the circuit breaker when a decrease in the current is not detected in the current detection step after a lapse of the predetermined length of time from turn-on of the circuit breaker has been counted in the counting step and when a short-circuit current flowing at the time of element short-circuiting of an inverter circuit included in the power converter is lower than a current that completely blows out the fuse.

5. The protection method according to claim 4, wherein the DC power supply is a solar cell panel, and the power generation system is a photovoltaic system.

* * * * *